United States Patent [19]

Hosoya

[11] Patent Number: 4,899,177
[45] Date of Patent: Feb. 6, 1990

[54] STRUCTURE FOR INSTALLING A RECORDING PEN

[75] Inventor: Tsuguharu Hosoya, Ichikawa, Japan
[73] Assignee: 501 Nihon Kohden Corporation, Tokyo, Japan
[21] Appl. No.: 305,389
[22] Filed: Feb. 1, 1989
[51] Int. Cl.[4] ............................................. G01D 15/16
[52] U.S. Cl. ............................. 346/139 R; 346/140 R
[58] Field of Search ............ 346/139 R, 140 R, 117 R

[56] References Cited

U.S. PATENT DOCUMENTS

| 3,206,756 | 9/1965 | Thayer et al. | 346/117 R |
| 3,713,171 | 1/1973 | Schepartz | 346/140 R X |
| 3,930,259 | 12/1975 | Hoskins | 346/139 R |

Primary Examiner—George H. Miller Jr.
Attorney, Agent, or Firm—Hoffmann & Baron

[57] ABSTRACT

A structure for installing a recording pen, in which a proximal end of the recording pen for recording a measured waveform on a sheet of recording paper is secured to a drive shaft of a driving source for oscillating the recording pen. The structure of the present invention comprises a cylindrical spacer, a pen-holder, packing, an installation screw, and an adjustment screw. The cylindrical spacer is fitted about and secured to the drive shaft and has a step portion formed at one end thereof, and also has an axial direction. The packing has an upper surface an outer side portion, and is formed from a resilient material. The packing is fitted about the outer peripheral portion of the cylindrical spacer and abuts against the step portion thereof. The pen-holder is fitted about an outer peripheral portion of the cylindrical spacer and abuts against an upper surface of the packing. The adjustment screw is screwed into the pen-holder to which the proximal end of the recording pen is secured, and penetrates into the pen-holder in a direction parallel to the axial direction of the cylindrical spacer. The distal end or tip of the adjustment screw is adapted to press against the outer side portion of the packing, thereby causing frictional interengagement therebetween. Installation screw is screwed in the pen-holder perpendicular to the axial direction of the cylindrical spacer and is adapted to secure the pen-holder thereto.

2 Claims, 3 Drawing Sheets

STRUCTURE FOR INSTALLING A RECORDING PEN

FIELD OF INVENTION

The present invention relates generally to recording apparatus having a recording pen and a pen motor with a drive shaft, and more particularly relates to a structure for installing the recording pen securely to the drive shaft of the pen motor.

BACKGROUND OF THE INVENTION

Recording apparatus having a mechanism for securely installing the proximal end of a recording pen to a drive shaft of a pen motor for purposes of oscillating and driving the recording pen, has been generally known. An example of such recording apparatus is illustrated in FIG. 3, where a pen-holder 3 is installed over the center of a drive shaft 2 of a pen motor 1 via an installation hole 3a. In such prior art recording apparatus, a resilient plate 6 is provided at a proximal end of a recording pen 5 by means of two screws 4, which are secured to the upper surface of this pen-holder 3. The resilient plate 6 is arranged such that adjustment of its height is effected by means of an adjustment screw 7 screwed into the pen-holder 3. A cutout 3b communicating with the installation hole 3a is formed in a radial direction in one side of the pen-holder 3. A threaded hole 3c is provided in the pen-holder 3 perpendicular to this cutout 3b, and an installation screw 8 is screwed into this threaded hole 3c. Thereafter, as installation screw is tightened, the pen-holder 3 is secured to the drive shaft 2. Notably, an ink supply port denoted by reference number 9, is provided for supplying ink to a distal end of the recording pen 5.

In order to install the recording pen 5 and pen-holder 3 sub-assembly to the drive shaft 2 of the pen motor 1, pen-holder 3 is first mounted onto the drive shaft 2, and then recording pen 5 and pen-holder 3 sub-assembly is positioned so that the recording pen 5 is disposed perpendicular with respect to reference line 10 of the pen motor 1. In such an arrangement, the "pen installation angle" of the recording pen 5 with respect to the reference line 10 of the pen motor 1 is 90°, as desired.

In order for the recording apparatus to function properly, it is essential that the recording pen 5 be accurately installed in a perpendicular manner with respect to a reference line 10 of a pen motor 1. However, using the above-described conventional pen installation device, a serious problem arises. Specifically, when the installation screw 8 is tightened to secure the pen-holder 3 to the drive shaft 2, the recording pen 5 (being accurately positioned in advance) is liable to, and typically does move with respect to reference line 10, and as a result, an error in the installation angle of the recording pen 5 occurs.

Thus, there is a great need for a simple recording pen installation mechanism which prevents the recording pen from rotating with respect to the reference line of the pen motor, as the installation screw is tightened, and also, a mechanism which provides secure mounting of the pen with respect to the drive shaft of the pen motor. As the prior art has failed in this regard, errors in "pen installation angles" occur often, thereby affecting the overall performance of the recording apparatus of which the recording pen is only a part.

SUMMARY OF THE INVENTION

To this end, the present invention provides a structure for installing to the drive shaft of a driving source, a recording pen for recording a measured waveform on a sheet of recording paper by ink writing. In such recording apparatus, the proximal end of the recording pen is secured to the drive shaft of the driving source for the purpose of oscillating the recording pen.

The structure of the present invention comprises a cylindrical spacer, a pen holder, a packing, an installation screw, and an adjustment screw. The cylindrical spacer is fitted about and secured to the drive shaft and has a step portion formed at one end thereof. Also, the cylindrical spacer has an axial direction. The packing has an upper surface and an outer peripheral portion, and is formed from a resilient material member. The packing is fitted about an outer periphery portion of the cylindrical spacer and abuts against the step portion thereof. The pen-holder is fitted about an outer periphery portion of the cylindrical spacer and abuts against an upper surface of the packing. The adjustment screw is screwed into the pen-holder to which the proximal end of the recording pen is secured, and penetrates into (i.e. passes through) the pen-holder in a direction parallel to the axial direction of the cylindrical spacer. The distal end or tip of the adjustment screw is adapted to press against an outer peripheral or side portion of the packing, thereby causing frictional interengagement therebetween. The installation screw is screwed in the pen-holder perpendicularly to the axial direction of the cylindrical spacer and is adapted to secure the pen-holder thereto.

According to the present invention, since the pen-holder for securing a proximal end of the recording pen is fitted with and supported by a spacer via packing secured to the drive shaft of a driving source, and since a tip of an adjusting screw is screwed onto the pen-holder and adapted to press against the packing, the position of the pen-holder relative to the spacer is fixed by way of this adjustment screw.

As a result of the present invention, only an axial forces are applied to the pen-holder and circumferential (tangential) forces are avoided. Thus, the recording pen is prevented from moving circumferentially with respect to the drive shaft, at the time of pen alignment installation.

Another advantage of the present invention is that since the positioning of the pen-holder and the spacer can be effected positively, the recording pen can be secured to the drive shaft of the pen motor without their relative installation positions being offset.

BRIEF DESCRIPTION OF THE DRAWINGS

For a fuller understanding of the objects of the present invention, reference is made to the following detailed description of the preferred embodiment which is to be taken in connection with the accompanying drawings, wherein.

DETAILED DESCRIPTION OF THE PREFERRED EMBODIMENT

Referring now to the accompanying drawings, a description will be given of an embodiment of a structure for installing a recording pen in accordance with the present invention.

Figure 1:
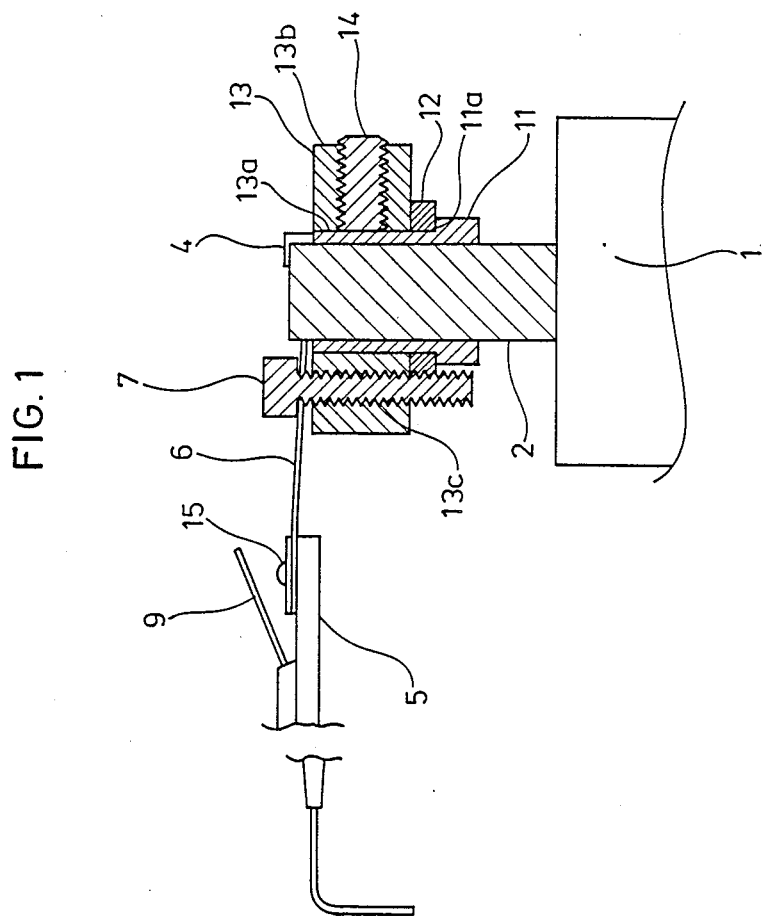
FIG. 1 is a side elevational, partly sectional view, of an embodiment of a structure for installing a recording pen in accordance with the principles of the present invention.
Figure 2:
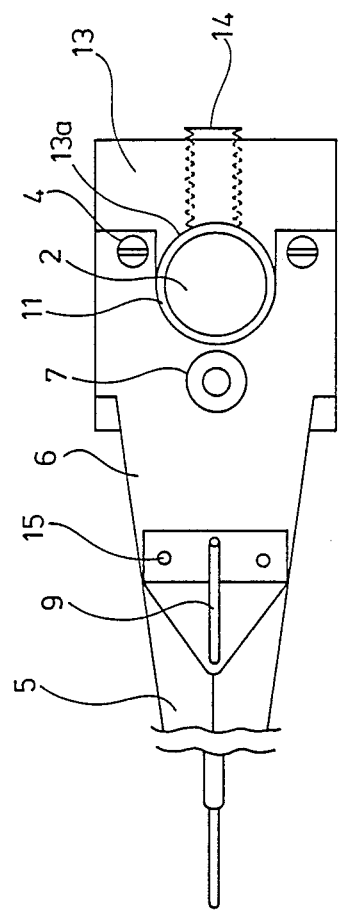
FIG. 2 is a top plan view of FIG. 1.
Figure 3:
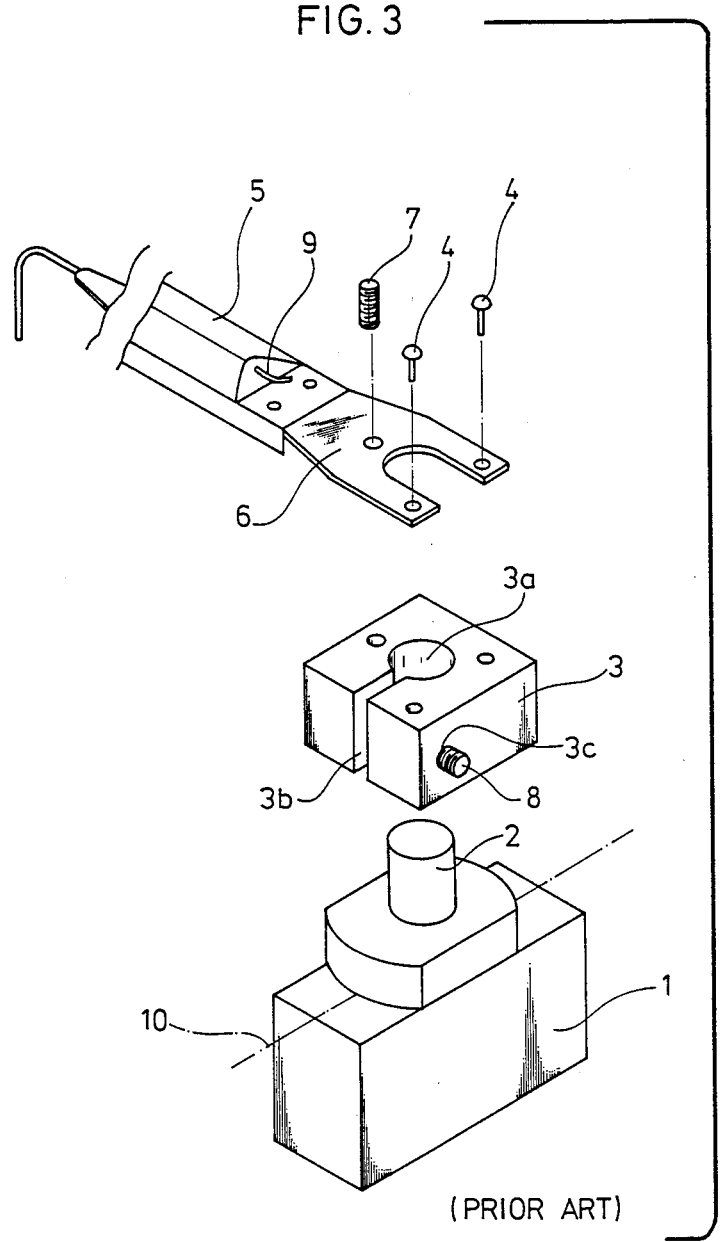
FIG. 3 is an exploded perspective view of a conventional structure of installing a recording pen.

In FIGS. 1 and 2, the preferred embodiment of the present invention is illustrated. In these drawings, those components that are identical with or equivalent to those of the prior art shown in FIG. 3 are denoted by the same reference numerals.

A cylindrical-shaped spacer 11, preferably formed of a soft metal material such as aluminum, is fitted with and secured to a drive shaft 2 of a pen motor 1. On the pen motor 1 side, the diameter of one end of this spacer 11 is extended or enlarged so as to form a step portion 11a therein. A piece of annular packing 12 formed of a resilient member, is closely fitted about the outer periphery portion of the spacer 11, and a lower surface of this packing 12 abuts against the step portion 11a formed in the spacer 11.

As illustrated in FIG. 1, in particular, substantially rectangular pen-holder 13 having an installation hole 13a formed in the central portion thereof, is first fitted against an upper portion of the packing 12, and around the outer periphery of the cylindrical spacer 11 via the installation hole 13a. A threaded hole 13b is formed in the pen-holder 13 in a direction perpendicular to the axial direction of the cylindrical spacer 11 notably, the axial direction of the spacer is along its longitudinal direction. In such an arrangement, the pen-holder 13 and the spacer 11 are integrated close to each other with the packing 12 being sandwiched between the bottom portion of the pen-holder 13 and the upper surface of the step portion 11a of spacer 11.

An installation screw 14 is also provided for screwing into the threaded hole 13b in the pen-holder 13. The arrangement is such, that as the installation screw 14 is tightened, the pen-holder 13 is secured to the cylindrical spacer 11.

In addition, a threaded hole 13c is formed completely through the pen-holder 13 in a direction that is parallel to the axial direction of the cylindrical spacer 11. Notably, since the pen-holder 13 has an axial direction as well, the axial direction of the cylindrical spacer 11 and axial direction of the pen-holder 13 will generally coincide. An adjustment screw 7 is screwed into threaded hole 13c and passes entirely therethrough. One end of this adjustment screw 7 projects from the lower surface of the pen-holder 13 and abuts against the outer side portion of the packing 12.

In a manner similar to that of the hereinbefore described prior art recording apparatus of FIG. 3, the proximal end of a recording pen 5 is secured to an upper surface of the pen-holder 13 by means of a screw 4 via a resilient plate 6. This pen-holder 13 is installed on the drive shaft 2 using the spacer 11 and an installation screw 14. Incidentally, reference numeral 15 denotes a screw for installing the resilient plate 6 to the proximal end of the recording pen 5.

The operation and advantages of the preferred embodiment will be described hereinbelow.

The assembly of the structure of the present invention is quite simple. First, the spacer 11 is placed over the drive shaft 2, and then packing 12 is slipped over the outer peripheral of the cylindrical spacer 11 and against the step portion 11a. Then, the pen-holder 13 (with resilient plate 6 attached thereto) is slipped over the spacer 11, and adjustment screw 7 is screwed into the pen-holder until the screw 7 passes entirely therethrough and the distal end of the screw 7 abuts against the outer side portion of packing 12, as discussed hereinbefore. Thereafter, adjustment screw 14 is tightened while pen recording angle is maintained at 90° with respect to reference line 10, as described hereinbefore. With the elements of the present invention assembled as described above, the following points are illustrated. In particular, the positioning of the pen-holder 13 with respect to the cylindrical spacer 11 could result in movement during "recording pen adjustment", that is, if only the pressing force of the installation screw 14 against the spacer 11 were present. However, to assure against such movement, the present invention effectively eliminates such problems by providing on the one hand, packing 12 which is clamped by the pen-holder 13 and the spacer 11, and on the other hand, packing 12 which is pressed by the adjustment screw 7 against the outer periphery of the spacer 11. Thus, movement of the pen-holder 13 in the rotating direction thereof with respect to the spacer 11, is prevented by the frictional force of the packing 12 against the adjacent surface of the adjustment screw 7.

Thus, as a result of the recording pen installation mechanism of the present invention, once the recording pen 5 has been positioned upon and secured to the drive shaft 2, the recording pen 5 will not undergo rotational movement with respect to the drive shaft 2, even if the adjustment screw 14 is over tightened, since only an axial force is applied to the pen-holder 13, and the application of tangential or circumferential forces (with respect to drive shaft 2) are wholly eliminated.

Furthermore, since the spacer 11 is preferably formed of a soft material, when the pen-holder 13 is secured to the spacer 11 by the tightening of the installation screw 14, the installation screw 14 easily penetrates into the relatively soft spacer 11 so an to form a "pressure fit" into the spacer 11, thereby allowing the positioning of the recording pen 5 with respect to the reference line 10, to be effected in a more positive fashion.

While particular embodiments shown and discussed above has proven to be useful in pen recording apparatus applications, further modifications of the present invention herein disclosed will occur to the person skilled in the art to which the present invention pertains, and also such modifications are deemed to be within the scope and spirit of the present invention defined by the dependent claims.

What is claimed is:

1. A structure for installing a recording pen, in which a proximal end of a recording pen for recording a measured waveform on a sheet of recording paper is secured to a drive shaft of a driving source for oscillating said recording pen, said structure comprising:

a cylindrical spacer fitted about and secured to said drive shaft and having a step portion formed at one end of said cylindrical spacer, said cylindrical spacer having an axial direction and an outer peripheral portion;

packing formed of a resilient material having an upper surface and an outer side portion and being fitted about said outer peripheral portion of said cylindrical spacer, and abutting against said step portion in said cylindrical spacer;

a pen-holder fitted about said outer peripheral portion of said cylindrical spacer and abutting against said upper surface of said packing;

an installation screw being screwed in said pen-holder perpendicularly to said axial direction of said cylindrical spacer, and being adapted to secure said pen-holder to said cylindrical spacer; and an adjustment screw having a distal end, said adjustment screw being screwed into said pen-holder to which said proximal end of said recording pen is secured, and passing through said pen-holder in a direction parallel to said axial direction of said cylindrical spacer, said distal end of said adjustment screw pressing against said outer side portion of said packing so as to provide frictional interengagement between said distal end of said adjustment screw and said outer side portion of said packing.

2. The structure for installing a recording pen according to claim 1, wherein said spacer is formed of a material which is relatively softer than that of said installation screw for securing said pen-holder.

* * * * *